May 20, 1969     R. J. PURTELL     3,444,941
AUTOMATIC IRRIGATOR Filed June 9, 1966                         Sheet _1_ of 7

FIG. 1

INVENTOR
RUFUS J. PURTELL

ATTORNEY

INVENTOR
RUFUS J. PURTELL
ATTORNEY

United States Patent Office 3,444,941
Patented May 20, 1969

3,444,941
AUTOMATIC IRRIGATOR
Rufus J. Purtell, Brownfield, Tex., assignor, by mesne assignments, to Tri-Matic Inc., Terry County, Tex., a corporation of Texas
Filed June 9, 1966, Ser. No. 561,670
Int. Cl. A01g *25/02;* B05b *3/18*
U.S. Cl. 137—14                       15 Claims

ABSTRACT OF THE DISCLOSURE

A traveling sprinkler pipe is mounted on vehicles for continuous movement while watering. The traveling pipe is connected by a hose to a valve on a main supply pipe. Periodically the hose is automatically disconnected from the valve on the main supply pipe and moved by a trolley to the next valve on the main supply pipe. A garden hose supplies water under pressure as a source of power to the trolley while it is disengaging the hose from one valve and moving it to the next.

---

This invention relates to agricultural irrigation and, more particularly, to a system for supplying a traveling sprinkler pipe with water under pressure from a stationary main line.

In making an automatic sprinkler irrigation system, it is necessary to supply water under pressure to a traveling pipe.

Previous solutions to this problem have often moved the traveling pipe in a circle around a supply point which forms the center of the circle; for example, see Winebrenner U.S. Patent 204,695. Other attempts to solve the problem have supplied two flexible hoses. Such a system is not completely automatic, but requires manual labor to keep stepping the rear hose forward. Such a system is shown in Behlen U.S. Patent 2,726,895.

Others have sought to solve the problem by providing a separate pump with an independent power supply to move with the traveling pipe and pump water from an open ditch; for example, see Weiss U.S. Patent 1,943,152 and Behlen U.S. Patent 2,726,895. Others using a separate pump and power supply have sough to get the water from a pipe which opens along the seam of the main line; see Poynor U.S. Patent 2,974,876. In nonanalogous arts, others have sought to transfer water under pressure from a stationary pipe to a traveling system by opening a seam in the stationary pipe; see Baker U.S. Patent 2,798,506.

I have solved the problem by providing a plurality of valves on the stationary main line and moving a trolley along the main line. A flexible pipe conveys water from the trolley to the traveling pipe. The traveling pipe is moving the greater portion of the time (e.g., 95% of the time), but, when it reaches the limit of its flexible pipe, it remains stationary while the trolley upon the main line automatically moves to the next valve, connects thereto, and begins again supplying water under pressure from the main line to the traveling pipe.

An object of this invention is to irrigate agricultural fields.

Another object is to provide water under pressure from a stationary line to a traveling agricultural irrigating sprinkler pipe.

Another object is to provide a system for irrigating an agricultural field automatically.

A further object is to provide all of the auxiliary equipment necessary to achieve the above objects.

Still further objects are to achieve the above with a system that is sturdy, compact, durable, simple, safe, versatile, and reliable, yet inexpensive and easy to manufacture, install, operate, and maintain.

Still further objects are to achieve the above with a method that is rapid and inexpensive and does not require skilled people to install, adjust, operate, and maintain.

The specific nature of the invention, as well as other objects, uses, and advantages thereof, will clearly appear from the following description and from the accompanying drawing, the different views of which are not necessarily to the same scale, in which:

Referring more particularly to the drawing, it may be seen that main supply line or pipe 10 extends along one edge of the field to be irrigated. The main pipe 10 may be buried but is illustrated on top of the ground. The main pipe 10 is supplied with water under pressure for irrigation. This means for supplying the main pipe 10 with water under pressure has been illustrated in FIG. 1 as a pump 12. Provisions are made, either by a constant pressure bypass valve (illustrated) or by the characteristics of the pump itself, that the supply of water under pressure is maintained whether or not there is a large supply of water being used, as when the land is being irrigated for 95% of the time, or whether only a small supply is being used, as when trolley 14 is being moved.

Figure 1:
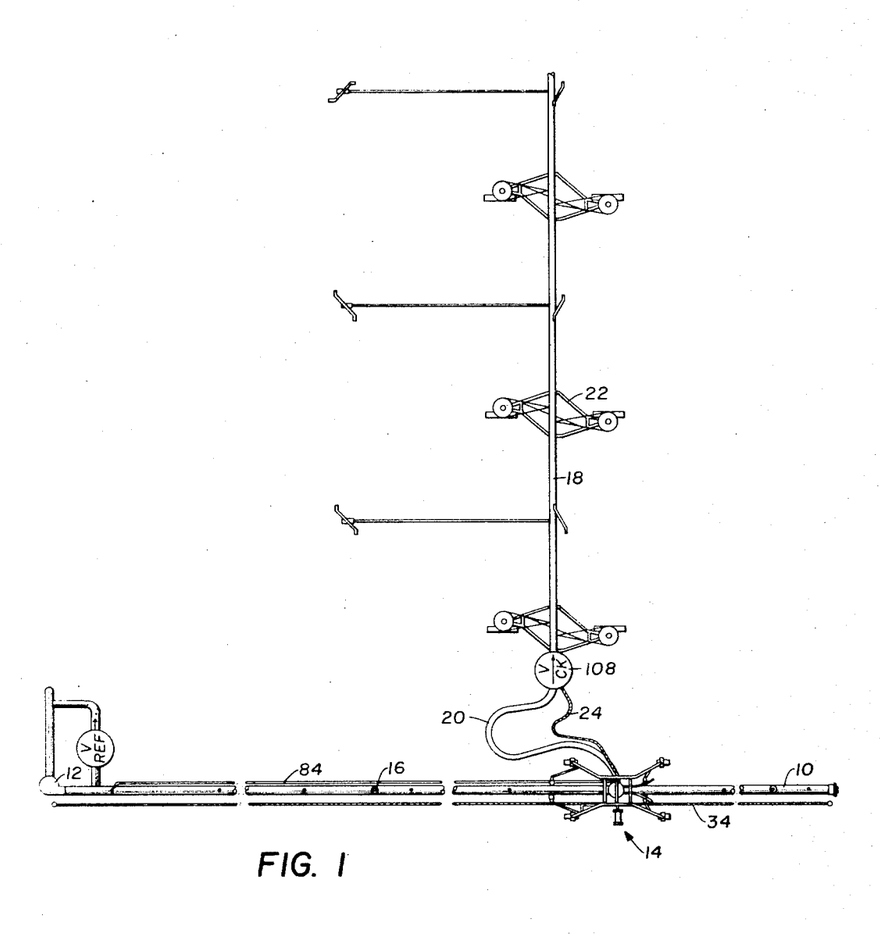
FIG. 1 is a plan view of the system, somewhat schematic, showing the general arrangement of the elements.

The main pipe 10 has a plurality of main supply ports or valves 16 located thereon at frequent intervals. The trolley 14 has means to move it along the main pipe 10 and to connect the valves 16 to traveling sprinkler pipe 18 through a flexible conduit or hose 20.

The traveling pipe 18 is supported by a plurality of vehicles 22. Each of the vehicles 22 has a means for driving it forward responsive to water pressure in the main pipe 10. Preferably this means is by water motors. Although a separate water motor could be supplied on each vehicle, as done with Behlen noted above, I prefer to use a vehicular system such as disclosed in my prior U.S. Patent No. 3,245,608 or No. 3,245,595 except for driving the shaft extending to the various vehicles by a water motor, as disclosed in Ruddell 2,931,579.

Sensing cable 24 connects the trolley 14 to the traveling pipe 18 at the end of the vehicles 22 so that, when the vehicles and the traveling pipe 18 progress ahead of the trolley 14, a signal is given to the trolley 14. Thereafter, the flow of water is stopped going to the traveling pipe 18. Inasmuch as the power for the vehicles 22 is responsive to pressure in the traveling pipe 18, stopping the flow of water to the traveling pipe 18 also stops the traveling pipe. Also, when the cable 24 gives its signal to the trolley, it begins the trolley moving forward to the next valve of the series of main valves 16. When the trolley reaches the next of the main valves 16, it attaches itself thereto and begins again the flow of water through the flexible conduit or hose 20 and into the traveling pipe 18. When there is again pressure upon the traveling pipe 18, the vehicles 22 begin again to propell the traveling pipe forward. As stated above, it is contemplated that the system be designed so that the traveling pipe moves for more than 95% of the time watering the land and moves less than 5% of the time between valves.

Figure 2:
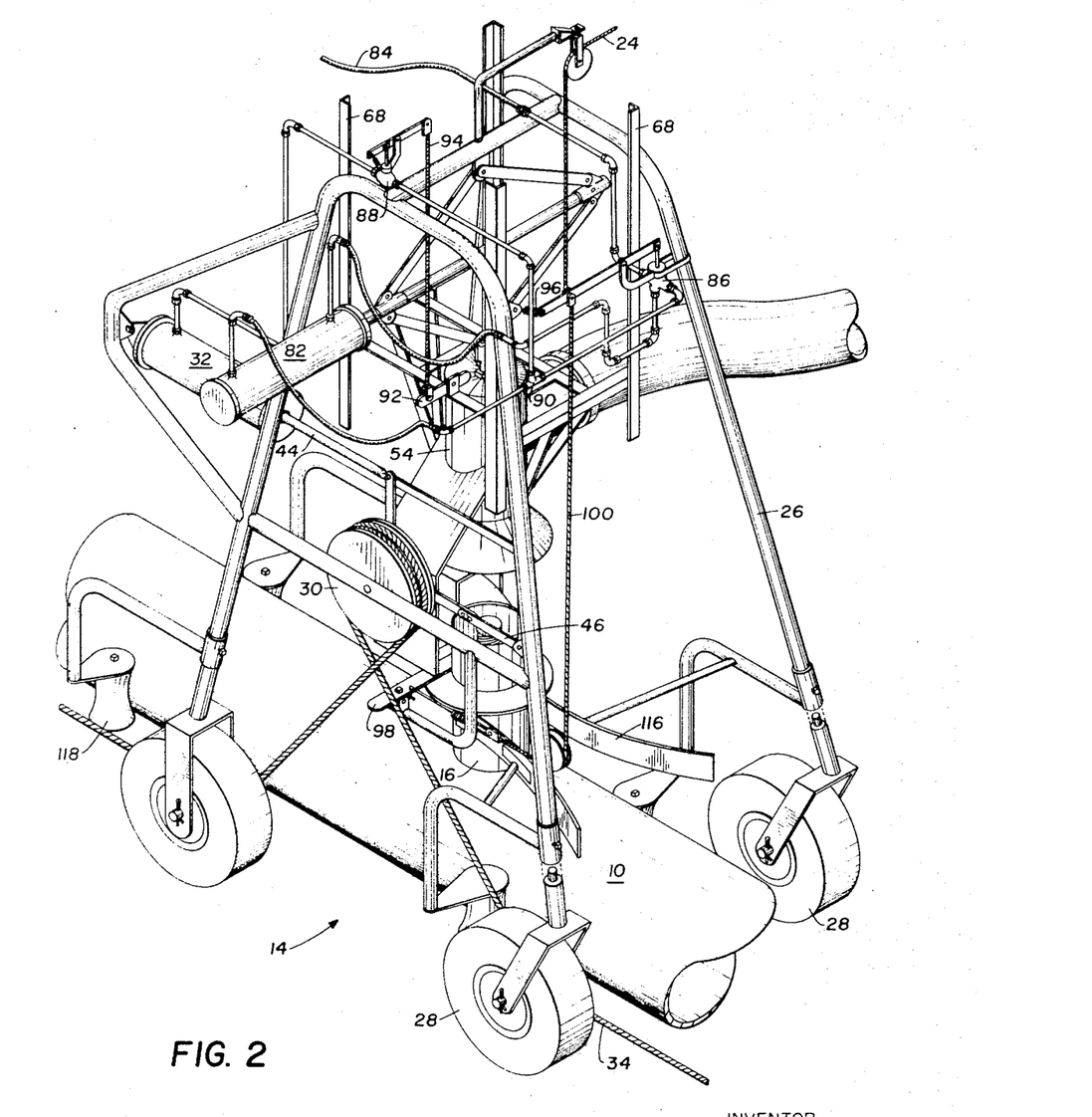
FIG. 2 is a perspective view of the trolley and one valve of the main line.
Figure 3:
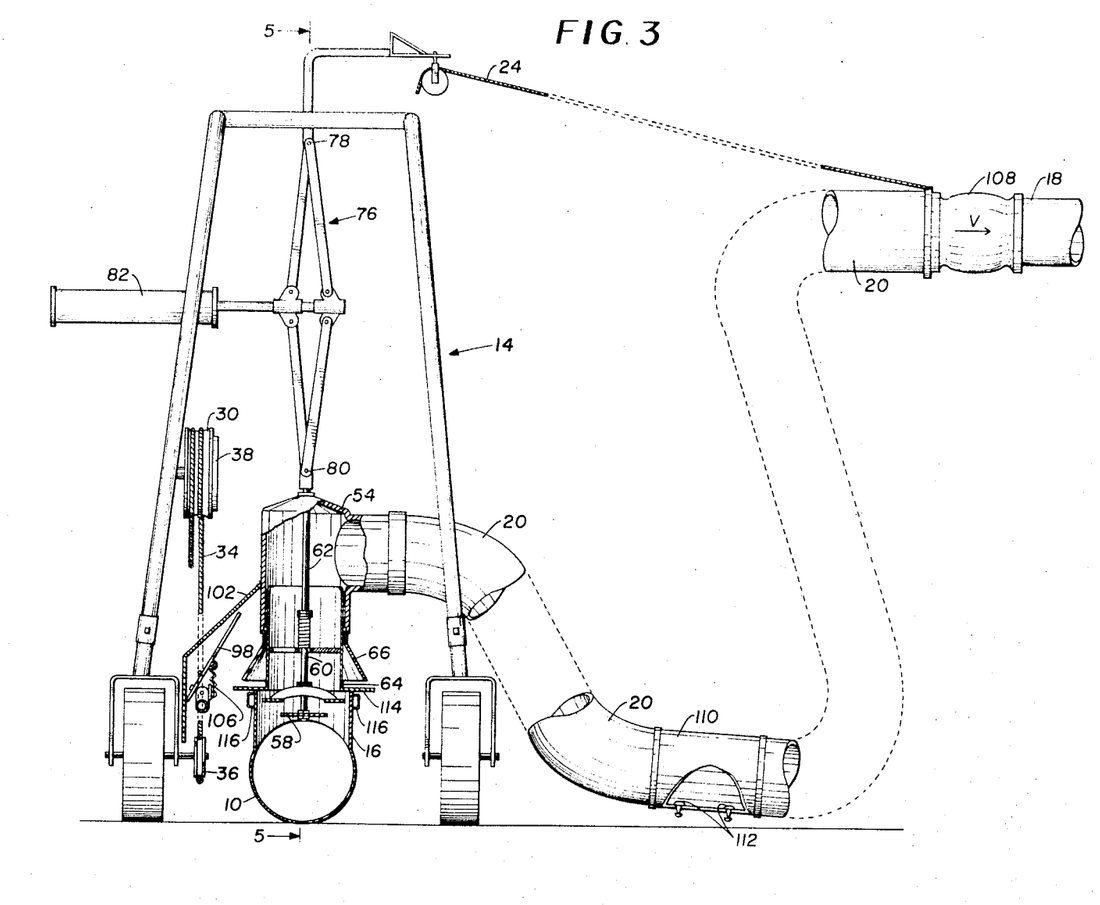
FIG. 3 is a front view of the trolley and flexible conduit.

Now describing more specifically the details of construction, the trolley 14 has a frame 26 and is supported by four ground-engaging wheels 28 (FIG. 2). Cathead or gypsy winch 30, mounted on frame 26, is driven by water motor 32. Power cable 34 is laid out parallel to the main supply pipe 10 and is secured at each end as by driving a stake into the ground. The cable extends and is guided by pulley 36 upon the lower portion of the frame 26 and from there up around the winch 30 and down around the second pulley 36 (FIG. 3). Therefore, it may be seen that, upon rotation of the winch 30, the trolley 14 is positively driven along the main line 10. Furthermore, it may be seen that, if no other means were provided for guiding the system (for example, the main pipe 10 were buried), the cable 24 would act to guide the trolley 14 from one main valve 16 to the next.

Figure 4:
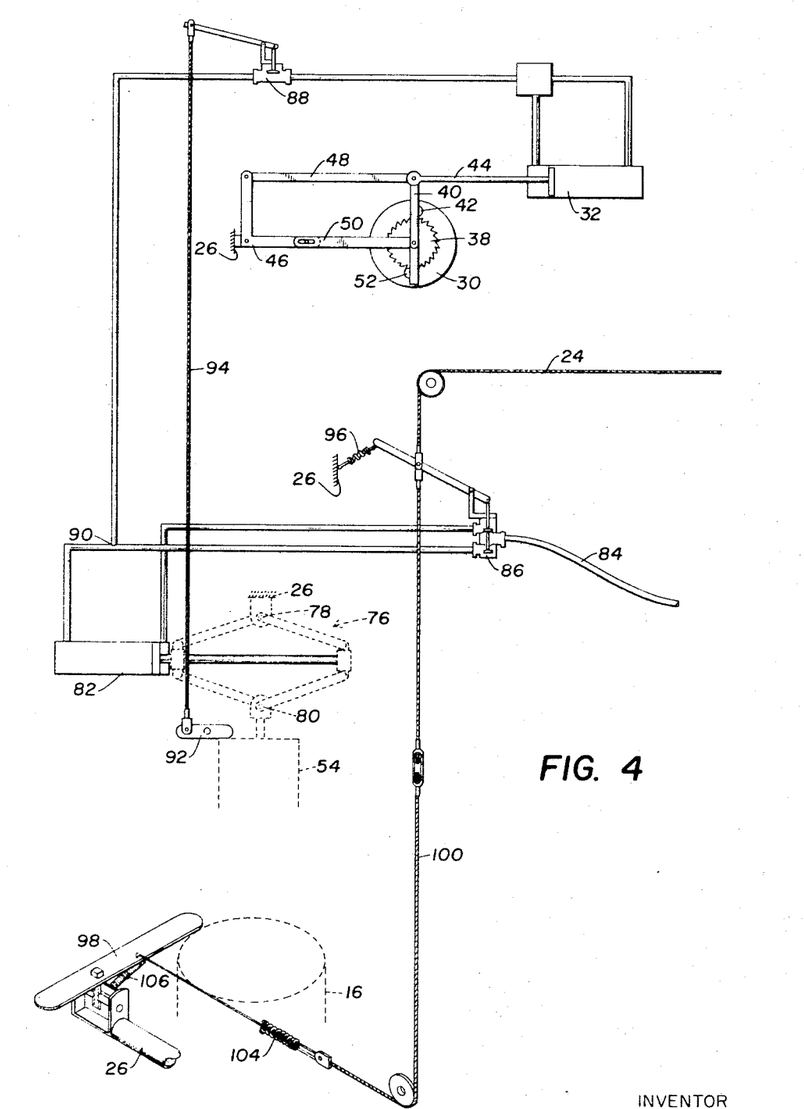
FIG. 4 is a schematic representation of the control elements.

The water motor 32 drives the winch through a ratchet 38 attached to the winch 30 (FIG. 4). One stroke of the water motor, which will be called the forward stroke, will move lever 40 forward so that dog 42 moves the ratchet 38 forward. Lever 40 is pivoted at one end to the same axle as supports the winch 30 and the ratchet 38 and the other end of the lever 40 is attached to the end of the piston rod 44 of the water motor 32. Reverse stroke of the water motor 32 operates bell crank 46 which is pivoted at its center to the frame 26. One end of the bell crank 46 is attached to pitman 48 which is itself attached to the piston rod 44, whereas the other end of the bell crank 46 is attached by a roller-in-slot arrangement into one end of drive bell crank 50. The other end of the drive bell crank 50 has thereon dog 52 which is engaged with the ratchet 38. The center of the drive bell crank 50 is pivoted to the same axle as winch 30 and ratchet 38. Analysis will show that reciprocation of the water motor 32 causes rotation of the winch 30 and movement of the trolley 14 along the power cable 34, thus advancing the trolley 14 from one main valve 16 to the next.

Figure 5:
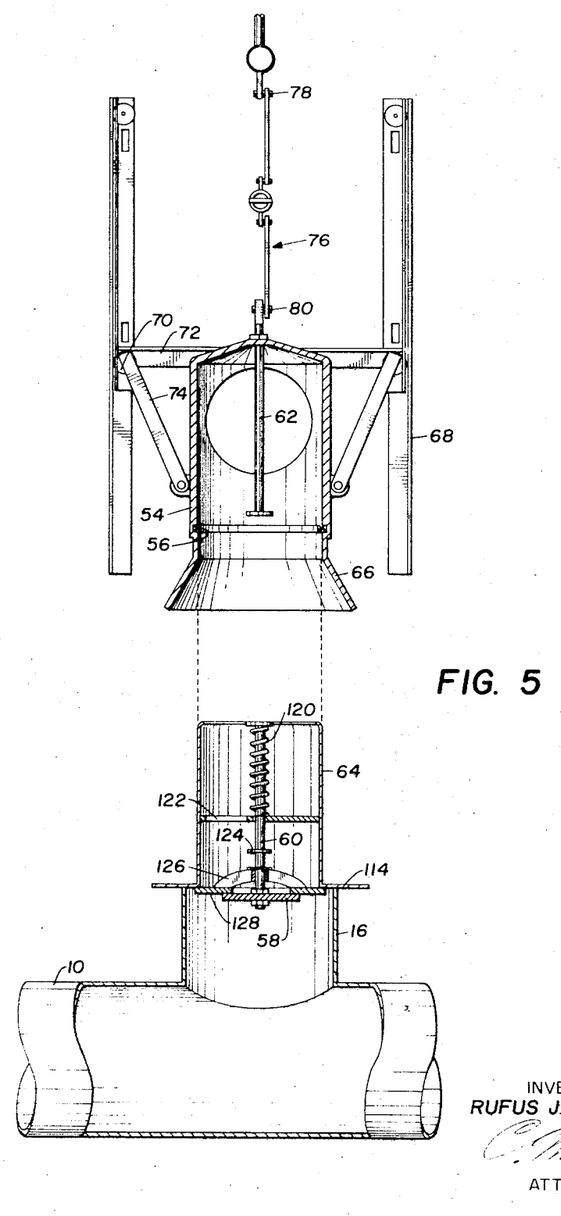
FIG. 5 is a partial side view of the main line valve and the connection of the trolley to the main line valve, taken on line 5—5 of FIG. 3 with the elements shown in a different position.

When the trolley 14 is registered over a valve 16 by means which will be explained later, the flexible hose 20 is connected to the valve by valve opener 54 (FIG. 5). The valve opener and valves are both cylindrical and therefore of correlative shape. The valve opener 54 is of slightly larger diameter than the outside housing 64 of the valve; therefore, it is adapted to telescope over it and form a fluid-tight seal thereto with gasket 56. Valve disc 58 itself is operated by vertical valve stem 60. Valve operator 62 is attached to the valve opener 54 concentrically therewith so that, after the gasket 56 has made a seal to outside housing 64, the operator 62 opens the valve disc 58, thus permitting flow of water from the main pipe 10 through the valve opener 54 and hose 20 into the traveling pipe 18.

The valve opener 54 has a funnel-shaped lower element 66 so that, if the trolley 14 is approximately registered with the valve 16, the valve opener 54 will be guided thereover. The valve opener 54 is mounted for vertical movement upon the frame 26 of the trolley 14. Specifically, the frame 26 includes four vertical angle irons 68. These form a track for wheels 70 of carriage 72. The carriage 72 has the valve opener 54 carried thereon by arms 74. With ordinary machine tolerances, there will be enough lost motion and looseness in the system so that the valve opener 54 can move slightly in any direction with respect to the frame 26 of the trolley 14.

Figure 6:
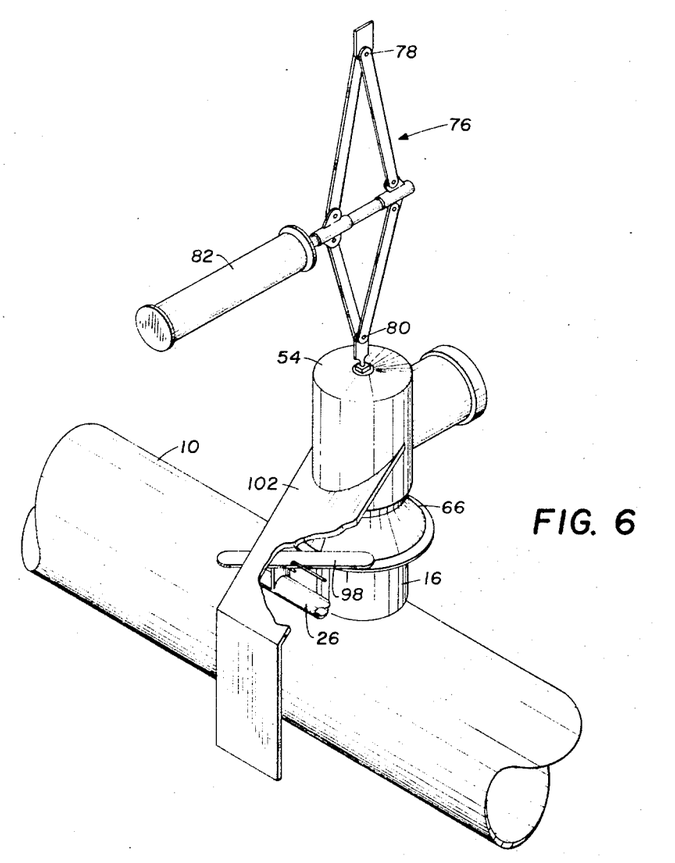
FIG. 6 is a partial perspective view showing the connection of the valve opener to the main line valve.
Figure 7:
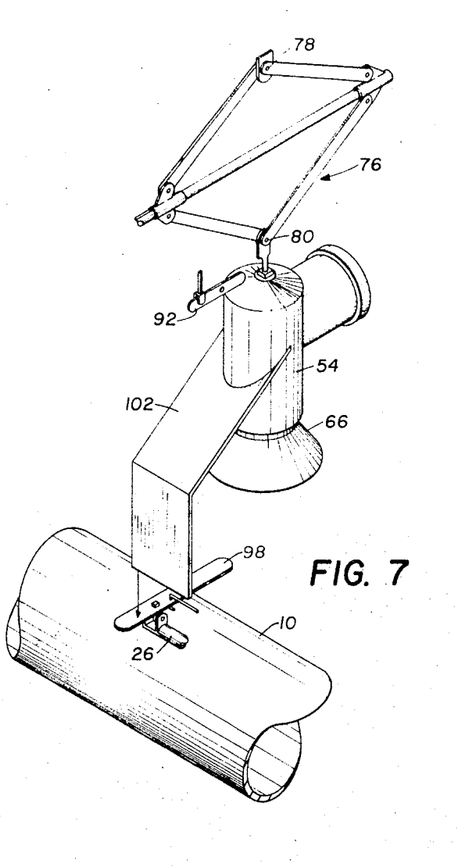
FIG. 7 and FIG. 8 are partial perspective views showing the valve opener and the main line in different positions.
Figure 8:
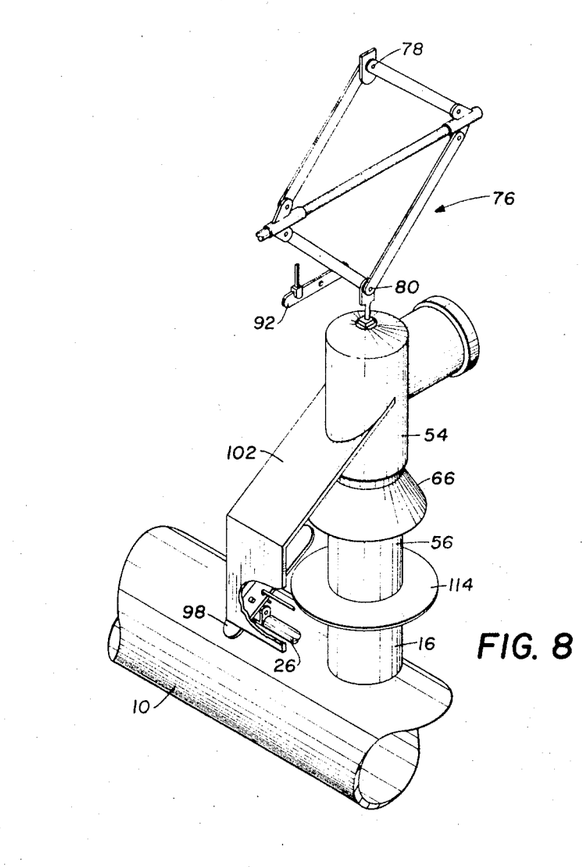

The valve opener 54 is moved vertically by expanding link mechanism 76 (FIG. 3). The expanding link mechanism 76 is composed of four links of equal length which are pivoted at each end. Two of them are pivoted to the frame 26 at 78 and the other two to the top of the valve opener 54 at 80. Each of the other ends are connected to power piston 82. When the power piston 82 is contracted, the valve opener 54 is forced downward (FIGS. 3 and 6). Furthermore, as the power piston 82 contracts, the mechanical advantage is greatly increased so that the last few inches of downward movement upon the valve opener is with great force, whereas the upward portion of movement is more rapid and with less force.

Although a fluid under pressure could be contained upon the trolley 14, as for example taught by my prior Patent 3,009,646, I prefer to drive the motor 32 and the power piston 82 by water pressure from the main pipe 10. Inasmuch as these two elements operate at a time when the main valves 16 are closed, it is necessary to supply an alternate connection (FIG. 1). This is done by attaching a small diameter hose 84 (such as an ordinary garden hose of suitable length, such as 100 feet) to a spigot in the main line 10. Therefore, this small diameter hose 84 may be of great length and readily dragged along the ground by the trolley 14 and is sufficient to furnish power for the trolley 14. The person operating the device, when making a regular daily or bidaily check, can readily advance the small diameter hose 84 as needed. Otherwise, it would be necessary to provide an extremely long hose which would have a high friction loss and result in a slower movement of the trolley 14.

The control system includes two valves: main control valve 86 and motor control valve 88 (FIG. 4). The valves are shown in the moving position in FIG. 4, i.e., the water power piston 82 would be maintaining the valve operator 54 in the raised removed position and the motor control valve 88 would be providing water to the water motor 32, thus driving the trolley forward. Particularly, the hose 84 would be connected to the main control valve 88 and the lever of the main control valve would be raised. This raised position closes the supply of water to the contracting side of power piston 82 and supplies water under pressure to the expanding side of the power piston 82. Inasmuch as the power piston 82 is expanded, the linkage 76 raises the valve opener 54. Furthermore, through T 90, water is supplied to the motor control valve 88 at the same time it is supplied to the expanding side of power piston 82. Motor control valve 88 is open at all times that the valve opener 54 is in the full raised position. When the valve opener is in the full raised position, it contacts lever 92 which opens the motor control valve 88 through cable 94. Compression spring 96 maintains the main control valve 86 in its position until it is positively changed. Therefore, in the condition shown, the trolley 14 continues to move along until some change is made. This change occurs when double pivoted lever 98 contacts valve housing 64. Upon this occurrence, it acts through cable 100 to reverse the main control valve 86. It will be noted that, when the trolley 14 comes to a valve 16, the trolley is moved forward so that the sensing cable 24 is now slack, thus permitting the main control valve 86 to become reversed. It may be seen further that, as soon as the main control valve 86 is reversed, immediately water under pressure is no longer supplied to T 90 and motor control valve 88; therefore, the forward motion of the trolley 14 ceases. Furthermore, water under pressure is supplied through main control valve 86 to the contracting side of power piston 82, forcing the valve opener 54 down upon the main valve 16, thus opening the main valve 16 and supplying water under pressure to the traveling pipe 18.

Upon supplying water under pressure to the traveling pipe 18, the water motors upon the vehicles 22 commence to operate—moving the vehicles 22 forward. This condition is maintained until the vehicles advance to a point so that the sensing cable 24 again becomes taut due to the advance of the traveling pipe 18. When the sensing cable 24 becomes taut, it again reverses the position of the main control valve 86. Upon this reversal, the water is supplied under pressure to the power piston 82 to raise the valve opener 54. Upon raising the valve opener 54, the valve 16 is closed and, therefore, no longer supplies water under pressure to the traveling pipe 18, thus causing the traveling pipe 18 to stop. However, the trolley 14 does not begin moving because the motor control valve 88 is closed. Motor control valve 88 remains closed until the valve opener 54 reaches the full raised position; then the motor control valve 88 is opened by actuation of lever 92 previously described. Therefore, the trolley 14 starts in forward motion.

The double pivoted lever 98 is lifted over valve housing 64 by actuator 102 which is attached above the funnel 66 of the valve opener 54. Each time the valve opener 54 lowers, the double pivoted lever 98 is pivoted about a horizontal axis so that the side of the lever contacting the housing is raised, permitting the lever to move forward upon the forward movement of the trolley 14. Spring 104 pulls double pivoted lever 98 forward (FIGS. 4 and 6) so it does not again fall into position behind the valve housing 64. As soon as the double pivoted lever 98, which is pivoted to the frame 26, moves forward of the housing 64, it is returned to its normal position by spring 106.

Check valve 108 in the connection between hose 20 and traveling pipe 18 prevents flow of water from the traveling pipe back around the area of the main supply pipe 10 when the valve opener 54 is removed from the valve housing 64 (FIG. 3). Otherwise, there would be a great deal of mud around the main supply pipe. Furthermore, each time when water was again supplied to the traveling pipe, it would be necessary to fill the traveling pipe again, which would be an unnecessary and wasteful use of the water.

The hose 20 has sleeve 110 about the center thereof. This sleeve has a plurality of valves 112 which are responsive to lack of pressure upon the sleeve 110. Therefore, valves 112 open if there is no pressure therein and are closed if there is pressure. Therefore, each time the valve opener 54 disengages from the valve housing 64, valves 112 open to drain the hose and, therefore, reduce the weight of the hose 20 to be moved forward with the trolley 14 each cycle.

Annular disc 114 surrounds each of the valve housing 64. Therefore, guides 116 upon the frame of the trolley 14 may slide along under the annular disc 114 to prevent upward movement of the trolley. It will be understood that there is a great deal of water pressure in the main line 10 which would otherwise tend to force the trolley upward. Also, rollers 118 are attached to the frame 26 of the trolley 14 to maintain the trolley 14 in its correct orientation to the main line 10.

Further describing the valve 16, it will be noted that it actually has two valve discs (FIG. 5). The smaller of these discs 58 is directly attached to the stem 60 which is biased upward by compression spring 120 bearing against spider 122 connected inside of the valve housing 64. Therefore, upon initial downward movement of the valve stem 60, this small valve disc opens, permitting water to flow into the valve opener 54 and increasing the pressure therein. After the pressure within the valve opener 54 has approximately equalized with the pressure in the main line 10, continued downward movement of the valve stem 60 causes washer 124, attached to the valve stem, to contact yoke 126 which is connected to larger annular or ported valve disc 128. Therefore, when the valve opener 54 is in the full down position, both the small disc 58 and the large disc 128 will be open (this position not shown in drawing), thus allowing a large fluid passage with low frictional loss from the main line 10 into the traveling pipe 18. However, it may be seen that the operating pressure to open the valve is greatly reduced inasmuch as the diameter of the valve disc 58 is much smaller than the total valve area; indeed the area of the small disc 58 is much smaller than the area of the annular valve disc 128.

I claim as my invention:

1. An automatic sprinkling system which comprises:
   [a] a pressurized main water pipe extending along an agricultural field and having
   [b] a series of normally closed valves,
   [c] a traveling elongated sprinkler pipe extending laterally from said main pipe and adapted to have sprinklers mounted thereon,
   [d] a trolley adapted to be guided from one valve to another and having
   [e] a flexible conduit extending to said sprinkler pipe with
   [f] a valve opener adapted to register with each of said valves,
   [g] means coupled to said main pipe for propelling said trolley powered by water pressure in said main pipe,
   [h] means operable upon registration between said mouth and said valve to inactivate the propelling force on said trolley and to open said valve, and
   [j] means powered by pressure from said main pipe in said traveling pipe for propelling said traveling pipe in a direction parallel to the length of said main line.

2. An agricultural irrigation system having
   [a] a traveling elongated sprinkler pipe adapted to have sprinklers mounted thereon,
   [b] a plurality of vehicles movingly supporting said traveling pipe,
   [c] vehicle-moving means attached to said vehicles for moving said vehicles and thus said traveling pipe,
   [d] a main supply pipe, and
   [e] means operatively associated with the main pipe for supplying water under pressure to the main pipe,
   [f] wherein the improvement comprises: an improved mechanism for transferring water from said main pipe to said traveling pipe including
   [g] a trolley,
   [h] trolley-moving means attached to said trolley for moving the trolley along said main pipe,
   [j] a plurality of main valves on the main pipe,
   [k] a valve opener on the trolley correlative to said valves,
   [m] flexible means connecting the valve opener and the traveling pipe for transferring water under pressure,
   [n] register means on the trolley for stopping the trolley-moving means responsive to the registry of the valve opener with one of said main valves, and
   [o] initiating means on the trolley for starting the trolley-moving means responsive to a predetermined position of the traveling pipe relative to the trolley.

3. The invention as defined in claim 2 with the additional limitation of
   [p] said valve opener mounted for movement on said trolley toward and away from said valve and
   [q] means on the trolley for moving the valve opener responsive to said register means.

4. The invention as defined in claim 2 with the additional limitation of
   [p] a small hose innerconnecting said trolley and main pipe for supplying water under pressure to the trolley-moving means and
   [q] said trolley-moving means including a water-actuated motor.

5. The invention as defined in claim 2 with the additional limitation of
   [p] a cable attached along the main pipe and
   [q] a winch on the trolley which forms a part of said trolley-moving means.

6. The invention as defined in claim 2 wherein
   [p] said main valves are poppet velves with an upward extending valve stem,

[q] said valve opener telescopes over said main valves, and
[r] a valve operator is attached within said valve opener.

7. The invention as defined in claim 6 with the additional limitation of
[s] said valve opener being mounted for movement on said trolley toward and away from said valve and
[t] means on the trolley for moving the valve opener responsive to said register means.

8. The invention as defined in claim 7 wherein
[u] said means for moving the valve opener includes a water motor and
[v] a small hose interconnecting said trolley and main pipe supplies water under pressure to said valve opener-moving means and to said trolley-moving means.

9. The invention as defined in claim 6 with the additional limitation of
[s] a gasket attached to said valve opener to form a seal between the valve opener and the valve.

10. The invention as defined in claim 9 with the additional limitation of
[t] said poppet valves including:
 (i) a disc attached to said stem
 (ii) a valve seat attached to the main pipe, and
 (iii) at least one ported disc between said disc and said valve seat,
[u] so arranged and constructed that initial movement of the stem and thus the disc equalizes pressure from within the main pipe and the valve opener.

11. The invention as defined in claim 10 with the additional limitation of
[v] a yoke on said ported disc
[w] so arranged and constructed that additional movement moves said ported disc from the valve seat, thus providing full flow through said valve.

12. In an agricultural irrigation system having
(a) a traveling elongated sprinkler pipe adapted to have sprinklers mounted thereon,
(b) a plurality of vehicles movingly-supporting said traveling pipe,
(c) vehicle-moving means attached to said vehicles for moving said vehicles and thus said traveling pipe,
(d) a main supply pipe, and
(e) means operatively associated with the main pipe for supplying water under pressure in the main pipe;
(f) the improvement comprising the method of transferring water from the main pipe to the traveling pipe including the steps of:
(g) moving a flexible conduit along the main pipe,
(h) sealing the flexible conduit to valves in the main pipe sequentially,
(j) opening the valves after the conduit has been sealed thereto, thus
(k) supplying water under pressure to the traveling pipe,
(m) disconnecting the flexible conduit from the valves responsive to the position of the traveling pipe,
(n) moving a trolley along the main pipe, and
(o) moving a valve opener on the flexible conduit into engagement with the main valves,
(p) said valve opener movement being relative to the trolley.

13. An agricultural irrigation system having
[a] a traveling elongated sprinkler pipe adapted to have sprinklers mounted thereon,
[b] a plurality of vehicles movingly-supporting said traveling pipe,
[c] vehicle-moving means attached to said vehicles for moving said vehicles and thus said traveling pipe,
[d] a main supply pipe, and
[e] means operatively associated with the main pipe for supplying water under pressure to the main pipe,
[f] wherein the improvement comprises the method of transferring water from the main pipe to the traveling pipe including the steps of:
[g] moving a trolley along the main pipe,
[h] stopping the trolley at each of a series of main valves,
[j] moving a valve opener on the trolley into engagement with the main valve,
[k] sealing the valve opener to the main valve,
[m] opening the main valve, thus
[n] supplying water under pressure responsive to movement of the valve opener on the trolley,
[o] disengaging the valve opener from the main valve responsive to position of the traveling pipe, and
[p] initiating movement of the trolley responsive to disengagement of the valve opener from the main valve.

14. The invention as defined in claim 13 with the additional steps of
[q] supplying power in the form of water pressure through a small hose connecting the trolley and the main pipe.

15. The method of irrigating an agricultural field comprising the steps of:
[a] supplying water under pressure to a main supply pipe,
[b] moving a trolley along the main pipe,
[c] stopping the trolley at each of several main valves on the main pipe,
[d] transversely rectilinearly moving a traveling pipe across the field,
[e] transferring water under pressure from the main valves to the traveling pipe via the trolley while the traveling pipe is moving,
[f] stopping the traveling pipe while the trolley moves, and
[g] stopping the trolley while the traveling pipe moves.

References Cited

UNITED STATES PATENTS

| | | | |
|---|---|---|---|
| 887,911 | 5/1908 | Bevill | 239—184 |
| 1,079,817 | 11/1913 | Williamson | 239—183 XR |
| 1,935,295 | 11/1933 | Kauffman | 239—186 |
| 2,475,388 | 7/1949 | Hart et al. | 239—186 XR |
| 2,665,169 | 1/1954 | Tipton | 137—344 |
| 2,750,228 | 6/1956 | Engel | 239—184 |
| 2,889,948 | 6/1959 | Leuenberger | 239—212 XR |
| 3,155,370 | 11/1964 | Drumm et al. | 137—614.06 XR |
| 3,202,172 | 8/1965 | Bergeron et al. | 137—344 |
| 3,349,794 | 10/1967 | Behlen | 239—183 XR |

SAMUEL SCOTT, *Primary Examiner.*

U.S. Cl. X.R.

137—344; 239—183, 212